United States Patent
Guo et al.

(10) Patent No.: US 7,035,041 B1
(45) Date of Patent: Apr. 25, 2006

(54) DISPLACEMENT RESETTING SYSTEMS AND METHODS FOR THE SECOND STAGE OF A HARD DISK DRIVE DUAL-STAGE ACTUATOR

(75) Inventors: Lin Guo, Milpitas, CA (US); Xiaoping Hu, San Jose, CA (US); Wei Guo, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 120 days.

(21) Appl. No.: 10/366,544

(22) Filed: Feb. 12, 2003

Related U.S. Application Data

(60) Provisional application No. 60/357,020, filed on Feb. 12, 2002.

(51) Int. Cl.
*G11B 5/596* (2006.01)
(52) U.S. Cl. .................................................. 360/78.05
(58) Field of Classification Search ............. 360/78.05, 360/77.04, 77.02, 78.07, 264.7, 294.6; 711/111; 310/311
See application file for complete search history.

(56) References Cited

U.S. PATENT DOCUMENTS

| | | | | |
|---|---|---|---|---|
| 4,864,552 A | * | 9/1989 | Getreuer et al. | 369/44.34 |
| 5,452,275 A | * | 9/1995 | Ogawa | 369/44.11 |
| 5,920,441 A | * | 7/1999 | Cunningham et al. | 360/78.05 |
| 6,005,742 A | * | 12/1999 | Cunningham et al. | 360/78.05 |
| 6,088,187 A | * | 7/2000 | Takaishi | 360/78.05 |
| 6,741,417 B1 | * | 5/2004 | Hsin et al. | 360/78.05 |

\* cited by examiner

*Primary Examiner*—David Hudspeth
*Assistant Examiner*—Fred F. Tzeng
(74) *Attorney, Agent, or Firm*—Tejpal S. Hansra

(57) ABSTRACT

A control system and method for a disk drive comprising first and second actuator arms. The control system comprises first and second stages and a reset system. The first stage displaces the first arm. The second stage displaces the second arm relative to the first arm. The second stage defines a displacement offset when the disk drive begins a seek operation. The reset system discharges at least a portion of the displacement offset over time.

42 Claims, 12 Drawing Sheets

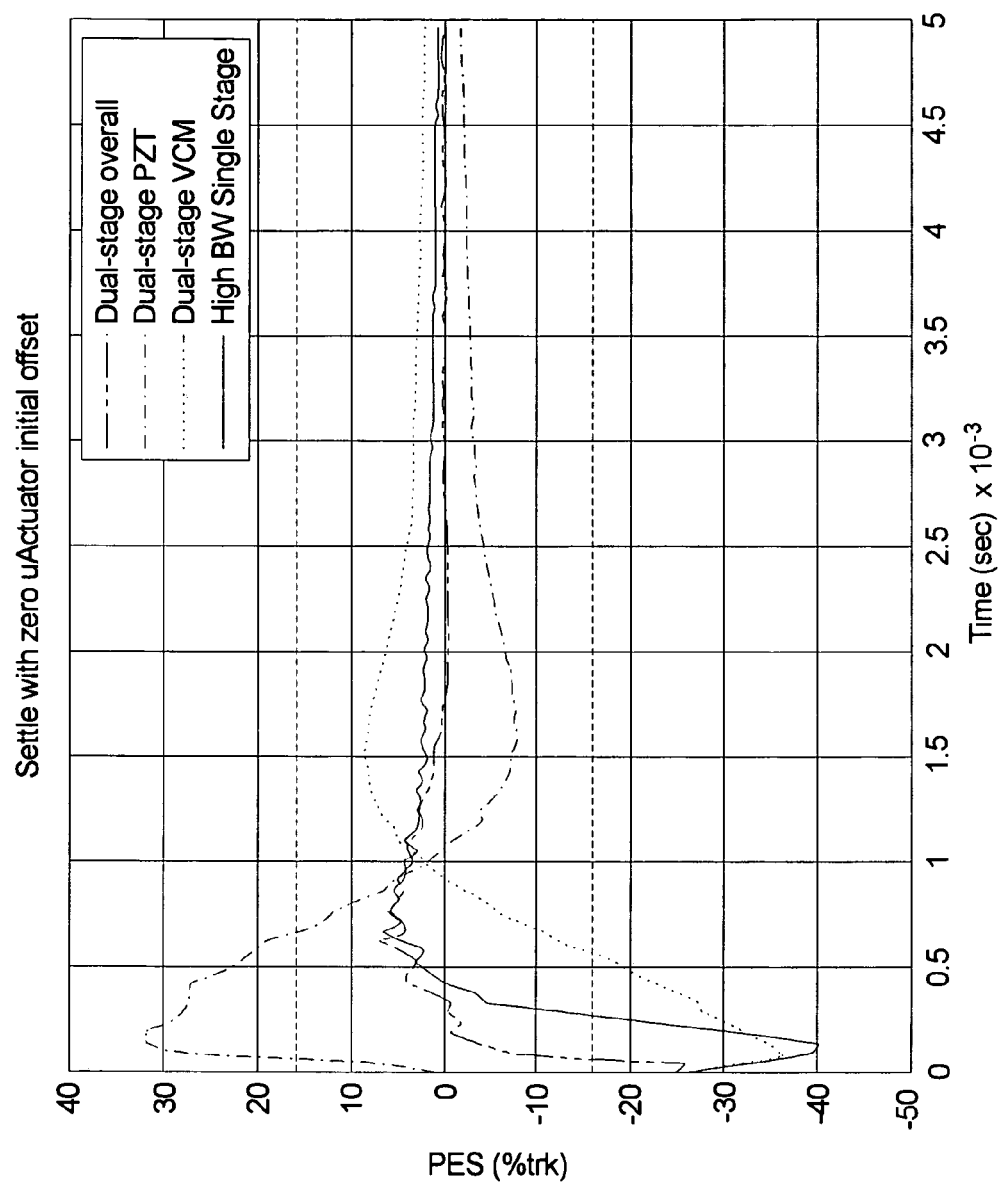

DISPLACEMENT RESETTING SYSTEMS AND METHODS FOR THE SECOND STAGE OF A HARD DISK DRIVE DUAL-STAGE ACTUATOR

RELATED APPLICATIONS

Priority is claimed from U.S. Provisional Patent Application Ser. No. 60/357,020 filed on Feb. 12, 2002, which is incorporated by reference in its entirety.

FIELD OF THE INVENTION

The present invention relates to digital storage devices and, more particularly, to hard disk drives having dual-stage control systems.

BACKGROUND OF THE INVENTION

A disk drive is a digital data storage device that stores information within concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the transducer while the transducer is positioned above (or below) the desired track. The write signal creates a variable magnetic field at a gap portion of the transducer that induces magnetically polarized transitions into the desired track. The magnetically polarized transitions are representative of the data being stored.

Reading is performed by sensing the magnetically polarized transitions on a track with the transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk. In a seek mode, the transducer is moved radially inwardly or outwardly to arrange the transducer above a desired track. In an on-track mode, the transducer reads data from or writes data to the desired track. The tracks are typically not completely circular. Accordingly, in the on-track mode the transducer must be moved radially inwardly and outwardly to ensure that the transducer is in a proper position relative to the desired track. The movement of the transducer in on-track mode is referred to as track following.

Many modern hard disk drives employ a dual-actuator system for moving the transducer radially relative to the disk. A first stage of a dual-actuator system is optimized for moving the transducer relatively large distances as is required during seek mode. A second stage of a dual-actuator system is optimized for moving the transducer relatively small distances to improve track following during on-track mode. The present invention relates to hard disk drives having dual-stage control systems.

FIG. 1 illustrates the major components of a standard disk drive, generally designated 10. FIG. 1 shows that the disk drive 10 includes a disk 12 that is rotated by a spin motor 14. The spin motor 14 is mounted to a base plate 16. The disk drive 10 includes at least one and typically a plurality of disks 12, each with one or two recording surfaces. The disk drive 10 further comprises control electronics generally designated by reference character 18 in FIG. 1. The control electronics 18 typically include a preamplifier, a read channel, a servo control unit, a microprocessor-based controller, and a random access memory (RAM). The control electronics 18 are or may be conventional and will not be described herein beyond what is necessary for a complete understanding of the present invention.

FIGS. 1 and 2 illustrate a mechanical portion 20 of a dual-stage control system. The mechanical portion 20 comprises a bearing assembly 22 that supports at least one actuator arm assembly 24. The actuator arm assembly 24 supports a head 26 adjacent to one recording surface 28 of one of the disks 12. The head 26 comprises the transducer described above; the head 26 will thus be referred to herein as the component that reads data from and writes data to the disk. Typically, the bearing assembly 22 will support one actuator arm assembly 24 adjacent to each of the recording surfaces 28 of each of the disks 12.

In the disk drive 10 having a dual-stage control system, each actuator arm assembly 24 includes a first arm 30 and a second arm 32. The bearing assembly 22 supports a proximal end 40 of the first arm 30 such that the first arm 30 rotates about a bearing axis A. A distal end 42 of the first arm 30 in turn supports a proximal end 44 of the second arm 32 such that the second arm 32 rotates about a second axis B. A distal end 46 of the second arm 32 supports the head 26.

FIG. 2 further illustrates that the hard drive 10 further comprises a primary actuator 50 and a secondary actuator 52. In many hard disk drive systems, the primary actuator 50 is formed by voice coil motor (VCM), while the secondary actuator 52 is formed by a piezo-electric transducer (PZT). In this application, the primary actuator 50 will be referred to as the VCM 50 and the secondary actuator 52 will be referred to as the PZT 52. However, other types of actuators may be used instead of a VCM and/or PZT. For example, the secondary actuator 52 may be formed by a micro-electro-mechanical system (MEMS) actuator.

The VCM 50 is coupled to the proximal end 40 of the first arm 30 such that operation of the VCM 50 causes the first arm 30 to move within a predefined range of movement about the bearing axis A. The PZT 52 is supported by the distal end 42 of the first arm 30 and is coupled to the proximal end 44 of the second arm 32; operation of the PZT 52 causes the second arm 32 to move through a predefined range of movement relative to the second axis B. Depending upon the specific implementation of the secondary actuator 52, this movement can be linear or can be rotational as depicted in FIG. 2.

FIG. 3 contains a block diagram of a control system 60 representing a conventional two-stage actuator system. The control system 60 comprises a first stage 62 and a second stage 64. As generally described above, the disk 12 defines a plurality of tracks 66 in the form of generally concentric circles centered about a spindle axis C. The first stage 62 controls the VCM 50 and the second stage 64 controls the PZT 52 to support the head 26 adjacent to a desired one of the tracks 66.

More specifically, an input signal "R" is combined with a position error signal "PES" by a first summer circuit 70. The second stage 64 generates a second stage position signal $Y_2$ and a second stage position estimate signal "$Y_{2est}$" based on the output of the first summer circuit 70. The second summer circuit 72 combines the second stage position estimate signal "$Y_{2est}$" and the output of the first summer circuit 70. The first stage 62 generates a first stage position signal "$Y_1$" based on the output of the second summer circuit 72. A third summer circuit 74 combines the first and second stage position signals "$Y_1$" and "$Y_2$". System disturbances "d" are represented as an input to the third summer circuit 74. The position error signal "PES" is thus the result of combining the first and second position signals "$Y_1$" and "$Y_2$" with any system disturbances "d".

The source of the input signal "R" is or may be conventional and will be described here only to the extent necessary for a complete understanding of the present invention. Each of the tracks 66 contains data sectors containing stored data and servo sectors containing servo data. The servo data identifies each individual track 66 to assist in seek operations and is also configured to allow adjustment of the radial position of the head 26 during track following. The source of the input signal "R" is thus generated by a servo control unit of the control electronics 18 based on the servo data read from the disk 12.

Referring now back to FIG. 2, that figure shows that the first arm 30 defines a first arm axis D and the second arm 32 defines a second arm axis E. The PZT 52 moves the second arm 32 relative to the first arm 30 such that the position of the second arm axis E varies relative to the first arm axis D. In particular, as shown in FIG. 2, a range of movement "S" associated with the secondary actuator 52 is defined by the stroke "s+" and "s−" in either direction relative to a neutral position defined by the first arm axis D.

When the disk drive 10 is in on-track mode, the secondary actuator 52 moves the head 26 relative to the first arm 30 as necessary to follow the desired track. The term "actual displacement" (ds in FIG. 2) refers to the difference at any point in time of the head 26 relative the neutral position as defined by the first arm axis D. When the head 26 is in the neutral position, the actual displacement is zero.

FIG. 2 further identifies arbitrary first and second tracks 66a and 66b on the disk 12. The actuator arm assembly 24 is shown in an initial position by solid lines and in a target position by broken lines; the first track 66a will thus be referred to as the "initial track" and the second track 66b will be referred to as the "target track". It should be understood that the terms "initial track" and "target track" are relative to the position of the head 26 before and after a seek operation. Any track 66 on the disk 12 may be considered the initial track or the target track depending upon the state of the disk drive 10 before and after a particular seek operation.

FIG. 2 generally represents what will be referred to as a seek/settle process. The seek/settle process begins with the disk drive 10 originally in on-track mode with the head 26 following the initial track 66a. The disk drive 10 is then placed in seek mode to move the head 26 from the initial track 66a to the target track 66b. After the seek/settle process is completed, the disk drive 10 is then placed back into on-track mode with the head 26 following the target track 66b. No user data can be read from or written to the disk 12 for a substantial portion of the seek/settle process. Accordingly, when the disk drive 10 is used to store data as part of a larger system such as a personal computer, overall disk drive performance can be significantly affected by the characteristics of the seek/settle process.

One factor that contributes significantly to the duration of the seek/settle process is the amplitude of the off-track during settle. The secondary actuator has a potential to correct this off-track and thereby to improve the seek/settle performance. However due to the limited stroke of the secondary actuator its correction capability will be affected by the actual displacement. The term "initial displacement offset" will be used herein to refer to the actual displacement that exists when the drive 10 first enters seek mode. The term "displacement offset" will be used to refer to any residual actual displacement that exists because the initial displacement offset was non-zero when the disk drive 10 entered seek mode.

Ideally, no displacement offset will exist (first and second arm axes D and E aligned) at the start of any given seek operation. In this optimal case, the full range of movement of the second arm 32 is available to the second stage 64 for locating and following the target track 66b. In the worst case, the second arm 32 is at either extreme of its stroke. In this worst case, the second stage 64 can easily become saturated and non-responsive during a settle operation.

Typically, the displacement offset will be somewhere between neutral and the positive or negative maximum values. However, even a displacement offset value that is less than the maximum value can cause the second stage 64 to oscillate or "ring" as the dual-stage control system attempts to place the head 26 in a desired position relative to the target track. As long as the second stage 64 is saturated or ringing, the second stage 64 may be non-responsive and unable to cause the head 26 to track the target track 66.

Conventionally, several techniques have been used or proposed to accommodate displacement offset at the start of the seek/settle process. A first technique is simply to place the control system 60 in single-loop mode prior to initiating a seek operation. When the control system 60 enters single-loop mode, the second stage 64 is disabled, thereby "freezing" the displacement offset. The first stage 62 then moves the head 26 to the desired position relative to the target track, at which point the control system 60 is placed back in dual-loop mode to enable the second stage 64 and begin track following.

This first technique can cause several problems. First, when the control system 60 is changed from single-loop mode back to dual-loop mode, the value of the position estimate signal "$Y_{2est}$" is equal to the displacement offset prior to entering single-loop mode. Depending on the value of the displacement offset upon entering single-loop mode, the position estimate signal "$Y_{2est}$" may be the equivalent of injecting a significant step disturbance in the first stage loop when the system returns to dual-loop mode. This step disturbance can result in track misregistration that will increase settle time.

FIG. 4 illustrates the track misregistration that can occur when the value of the displacement offset is frozen upon entry into single-loop mode. FIG. 4 also compares the overall dual-stage performance with the performance of a high bandwidth single stage system. As depicted in FIG. 4, the settle associated with the two-stage actuator system is worse than that of the single stage system.

A second problem with the first technique is possible saturation of the second stage 64 over time. Freezing the displacement offset when placing the control system 60 in single-loop mode can define a false neutral position that may be offset from true neutral. After the hard drive 10 performs numerous seek/settle processes, the false neutral positions can accumulate such that the false neutral position is at or close to either the positive or negative maximum displacement value. As a result, the second stage 64 may immediately saturate and become non-responsive when the control system 60 is placed back in dual-loop mode.

FIG. 5 illustrates the track misregistration that can occur when the second stage 64 saturates because a false neutral position has been established. FIG. 5 also compares the overall dual-stage performance with the performance of a high bandwidth single stage system under similar conditions. Again, the settle associated with the two-stage actuator system is worse than that of the single stage system.

A second technique for decreasing seek/settle time is to set the displacement offset to zero at the beginning of the seek/settle process. Instantaneously zeroing the second stage 64 is the equivalent of injecting into the servo loop a step disturbance with a magnitude of equal to that of the displacement offset. Such a step disturbance may cause ringing that will adversely impact settle time.

FIG. 6 illustrates the track misregistration that can occur when the value of the displacement offset is reset to zero upon entry into single-loop mode. FIG. 6 also compares the overall dual-stage performance with the performance of a high bandwidth single stage system under similar conditions. Again, the settle associated with the two-stage actuator system is worse than that of the single stage system.

Accordingly, a need exists for a disk drive with a dual-stage actuator that reduces the duration of the overall seek/settle process and, in particular, which reduces the settle time caused by displacement of the second stage prior to entering the seek/settle process.

SUMMARY OF THE INVENTION

The present invention may be embodied as a control system for a disk drive comprising first and second actuator arms. The control system comprises first and second stages and a reset system. The first stage displaces the first arm. The second stage displaces the second arm relative to the first arm. The second stage defines a displacement offset when the disk drive begins a seek operation. The reset system discharges at least a portion of the displacement offset over time. The present invention may also be embodied as a disk drive comprising such a control system.

The present invention may also be embodied as a method of displacing first and second actuator arms of a disk drive. The method comprises the steps of providing a first stage for displacing the first arm; providing a second stage for displacing the second arm relative to the first arm; defining a displacement offset of the first arm relative to the second arm when the disk drive begins a seek operation; and discharging at least a portion of the displacement offset over time.

These and other objects, features, embodiments, and advantages of the invention will be apparent from the following specification taken in conjunction with the following drawings.

BRIEF DESCRIPTION OF THE DRAWINGS

FIGS. 11–13 are plots illustrating the settle time associated with a dual stage actuator using the control system depicted in FIG. 7.

DETAILED DESCRIPTION OF THE PREFERRED EMBODIMENT

Figure 1:
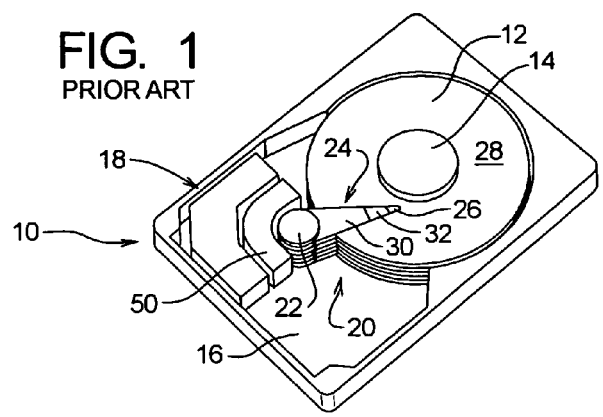
FIG. 1 is a perspective view of a disk drive.
Figure 2:
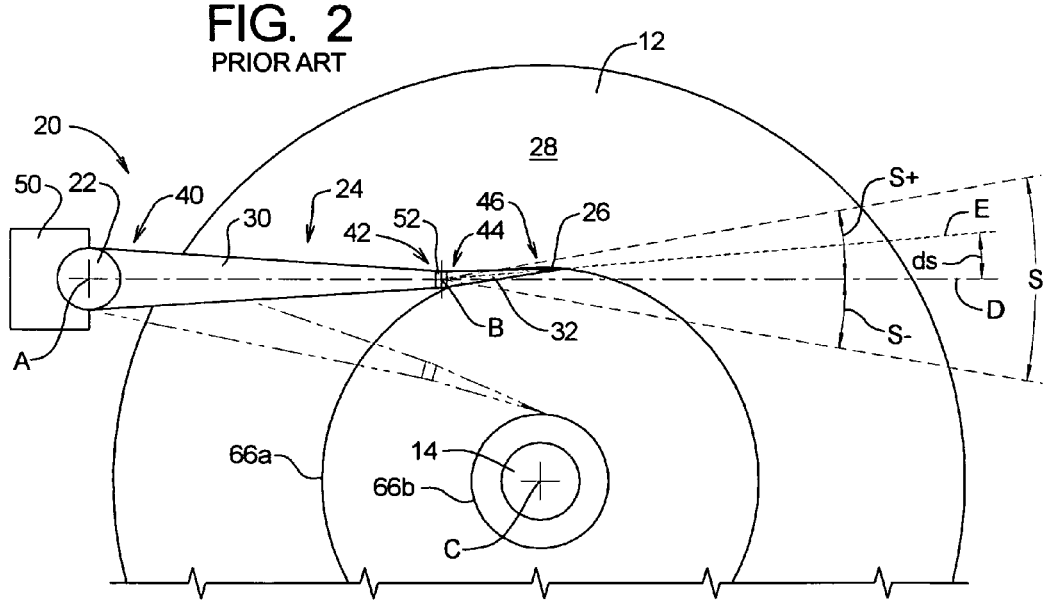
FIG. 2 is a schematic representation of a mechanical portion of a dual stage used by the disk drive of FIG. 1.
Figure 3:
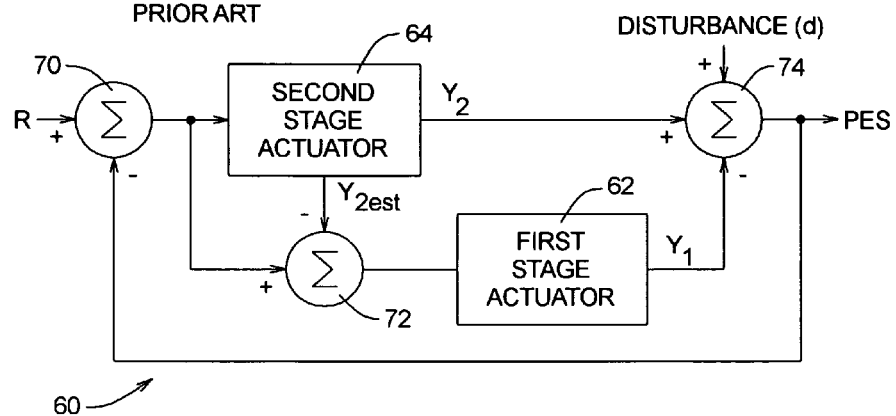
FIG. 3 is a block diagram representing a control system portion of a prior art dual stage actuator that may be used by the disk drive of FIG. 1.
Figure 4:
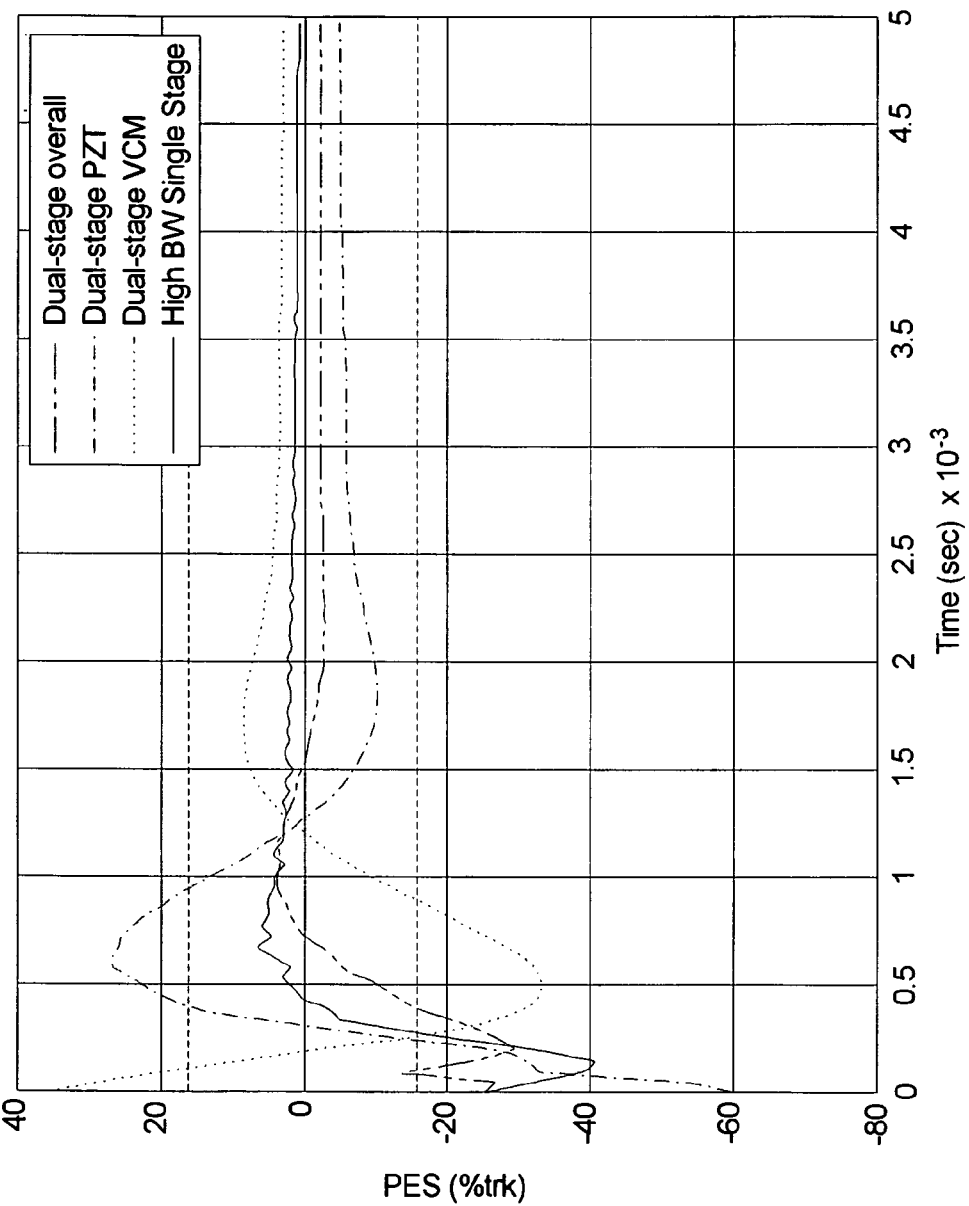
FIGS. 4–6 are plots illustrating the settle time associated with the prior art dual stage actuator using known or proposed schemes for accommodating displacement offset at the start of the seek/settle process.
Figure 5:
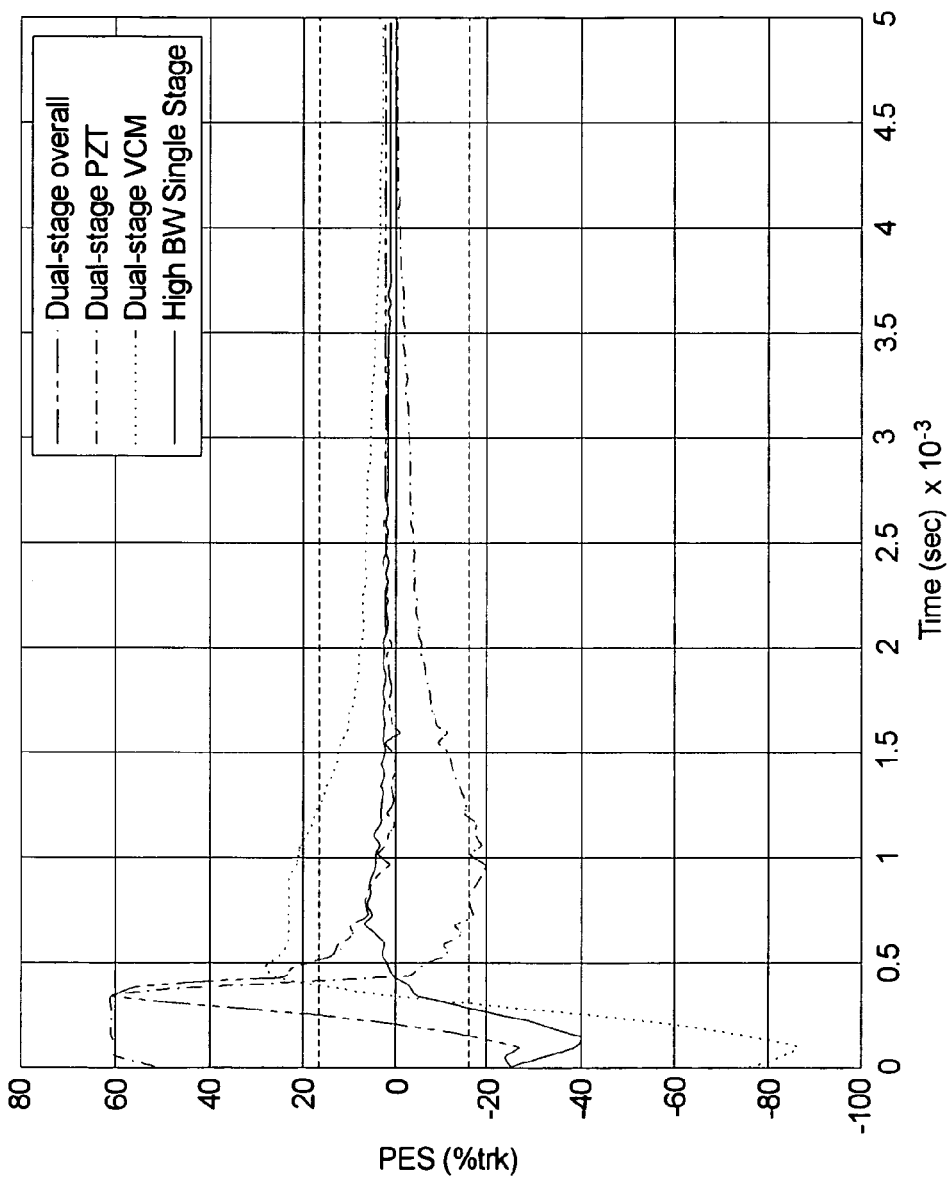
Figure 6:
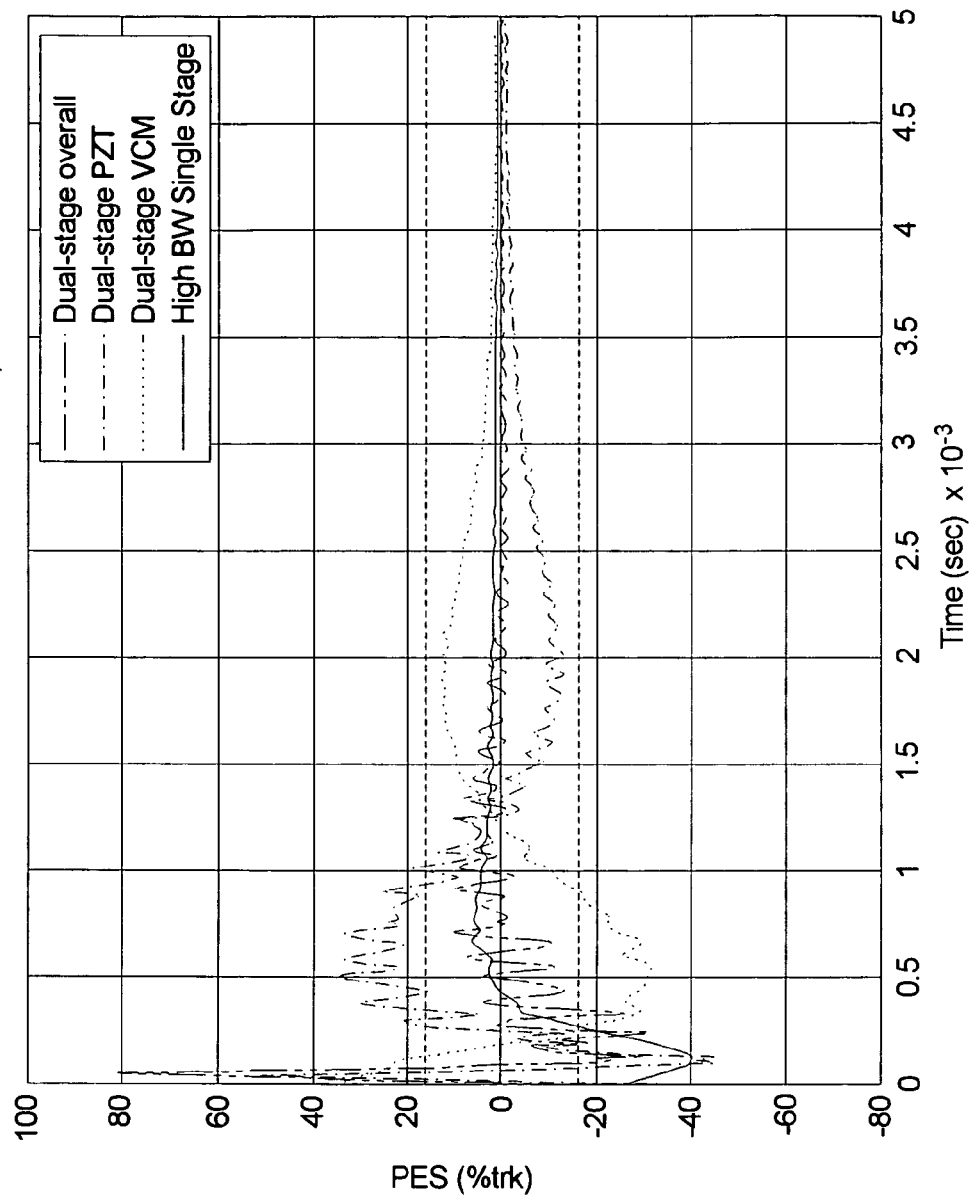
Figure 7:
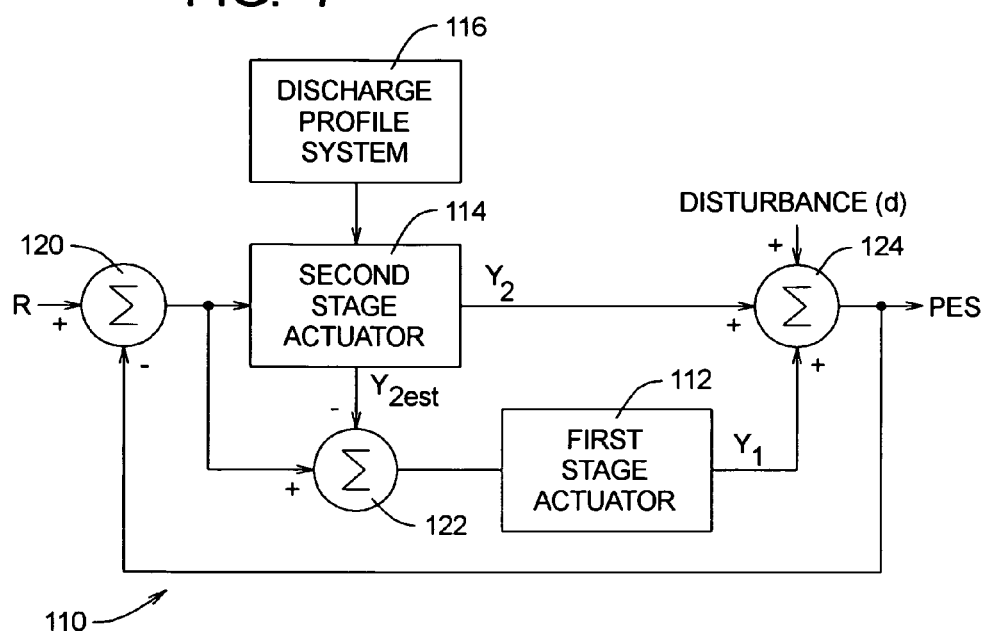
FIG. 7 is a block diagram representing a control system portion of a dual stage actuator of the present invention.

Reference is now made to FIG. 7, which illustrates a block diagram of an actuator control system 110 for use as part of a disk drive system like the disk drive system 10 described above. The control system 110 is similar to the conventional control system 60 described above in that the system 110 is a two-stage system comprising a first stage 112 and a second stage 114. However, the control system 110 of the present invention additionally comprises a reset system 116 that is operatively connected to the second stage 114.

As with the control system 60 described above, the first and second controllers 112 and 114 operate the VCM 50 and the PZT 52 to move the head 26 to a desired radial position relative to the disk 12. An input signal "R" is combined with a position error signal "PES" by a first summer circuit 120. The second stage 64 generates a second stage position signal $Y_2$ and a second stage position estimate signal "$Y_{2est}$" based on the output of the first summer circuit 120. A second summer circuit 122 combines the second stage position estimate signal "$Y_{2est}$" and the output of the first summer circuit 70. The first stage 122 generates a first stage position signal "$Y_1$" based on the output of the second summer circuit 122. A third summer circuit 124 combines the first and second stage position signals "$Y_1$" and "$Y_2$". System disturbances "d" are represented as an input to the third summer circuit 124.

During on-track mode, the second stage controller 114 generates a PZT voltage ($V_{PZT}$) for controlling the PZT 52. The reset system 116 is coupled to the second actuator stage 114 when the disk drive is in seek mode such that the PZT voltage is discharged or reset during the seek/settle process.

Figure 9:
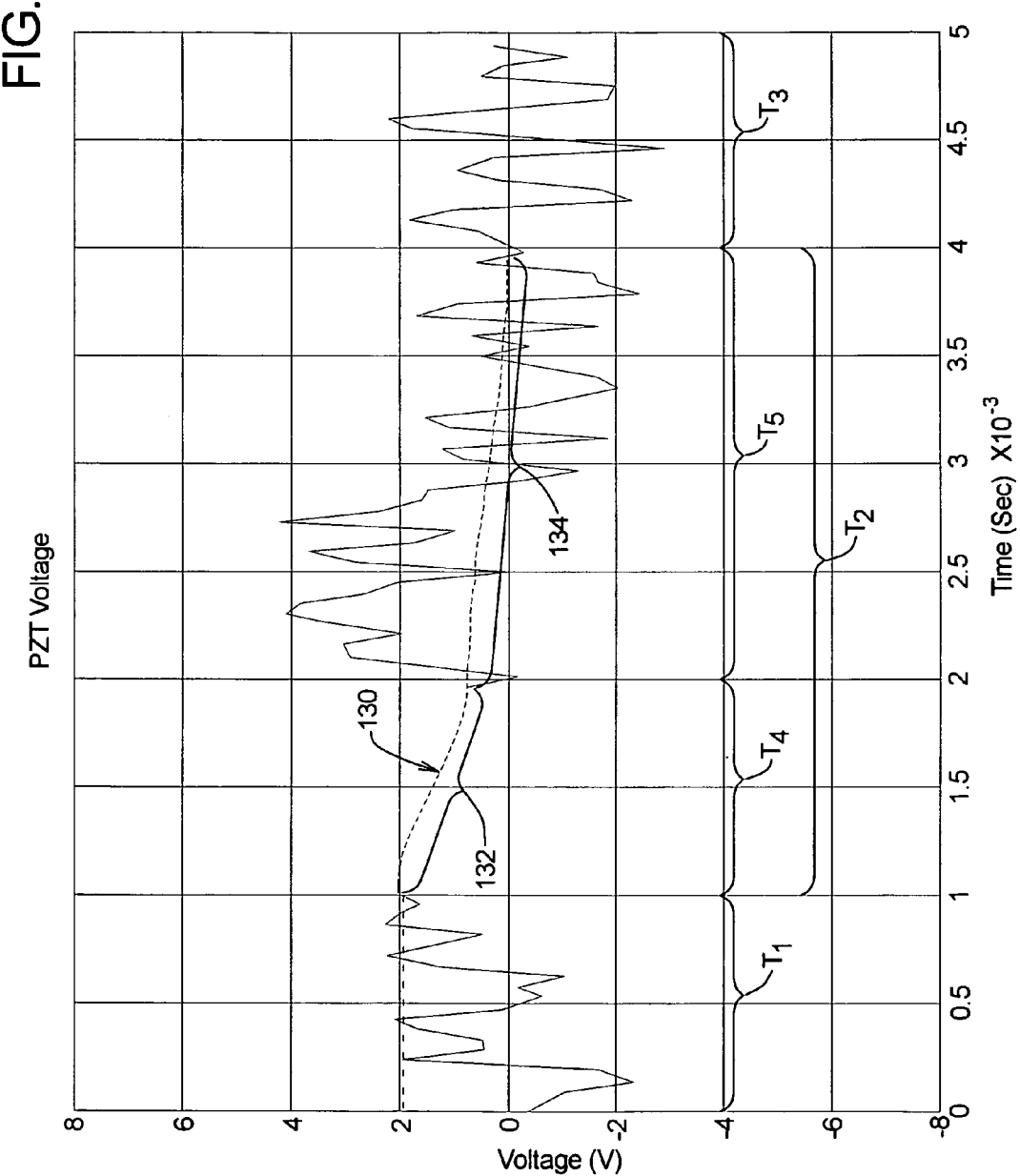
FIG. 9 is a graph illustrating an example of a seek/settle process implemented by the control system depicted in FIG. 7.

Referring to FIG. 9, depicted therein is a plot of voltage against time showing the PZT voltage before, during, and after an example of the seek/settle process. As shown in FIG. 9, the PZT voltage is normally within a 12 volt operational range centered about zero volts; the PZT voltage thus varies from approximately −6 volts to +6 volts. The range of movement "S" of the second arm 32 relative to the first arm 30 is substantially linearly related to the 12 volt operational range of the PZT voltage. In this case, the neutral position corresponds to zero volts, the maximum positive stroke "s+" corresponds to +6 volts, and the maximum negative stroke "s−" corresponds to −6 volts.

The characteristics of the PZT 52 are such that, as long as the PZT voltage is within the operational range, the value of the PZT voltage will determine the position of the second arm 32 relative to the first arm 30. However, if the PZT voltage reaches either +6 volts or −6 volts, the second stage 114 becomes saturated and is no longer capable of moving the second arm 32.

Referring now back to FIG. 9, during a first time period $T_1$ from zero to approximately 1 millisecond, the control system 110 is in on-track mode. At the end of the first time period $T_1$, the disk drive 10 enters seek mode. In the example shown in FIG. 9, the seek/settle process occurs within a second time period $T_2$ between approximately 1 millisecond and 4 milliseconds. After the seek/settle process is completed, the disk drive 10 returns to on-track mode. The system 110 then remains in on-track mode during a third time period $T_3$ between approximately 4 milliseconds and the next time the disk drive enters seek mode.

When the disk drive 10 is in on-track mode, the control system 110 operates in dual-loop mode with both of the first and second stages 112 and 114 enabled. Thus, the second stage 114 of the control system 110 generates the PZT voltage as necessary to cause the head 26 to follow one of the tracks 66 on the disk 12. In the first and third time periods $T_1$ and $T_3$ shown in FIG. 9, the PZT voltage varies but is always between approximately +2 volts and −2 volts; the PZT voltage is thus well within the operational range of the control system 110 during the first and third time periods $T_1$ and $T_3$.

As generally described above, the axis E of the second arm 32 may be offset from an axis D of the first arm 30 when the disk drive 10 enters seek mode. The magnitude of the PZT voltage when the disk drive enters seek mode represents the initial displacement offset described above.

In the example shown in FIG. 9, the PZT voltage associated with the initial displacement offset would have been approximately −2 volts if the seek/settle process was initiated at approximately 0.2 seconds and approximately 0 volts if the seek/settle process was initiated at approximately 0.5 seconds. However, under the conditions shown in FIG. 9, the PZT voltage is approximately +2 volts at the end of the first time period $T_1$ when the seek/settle process is initiated. Accordingly, in the example of FIG. 9, the initial displacement offset of the second stage 114 of the control system 110 is represented by a PZT voltage of approximately 2 volts.

A dotted line in FIG. 9 represents a profile 130 of the displacement offset during the seek/settle process. The displacement offset profile 130 represents the magnitude of the displacement offset remaining at any point during the seek/settle process.

FIG. 9 further illustrates that the seek/settle process associated with the second time period $T_2$ may be divided into a single-mode portion $T_4$ and a dual-mode portion $T_5$. The exemplary discharge profile 130 comprises a first profile portion 132 and a second profile portion 134 corresponding to the single-mode and dual-mode portions $T_4$ and $T_5$, respectively.

As shown in FIG. 9, the reset system 116 discharges or resets the displacement offset (i.e., reduces or increases the displacement offset to neutral or zero) during the seek/settle process. As will be described in further detail below, the reset system 116 resets the displacement offset to zero in a manner that reduces disturbances introduced into the control system 110.

Figure 8:
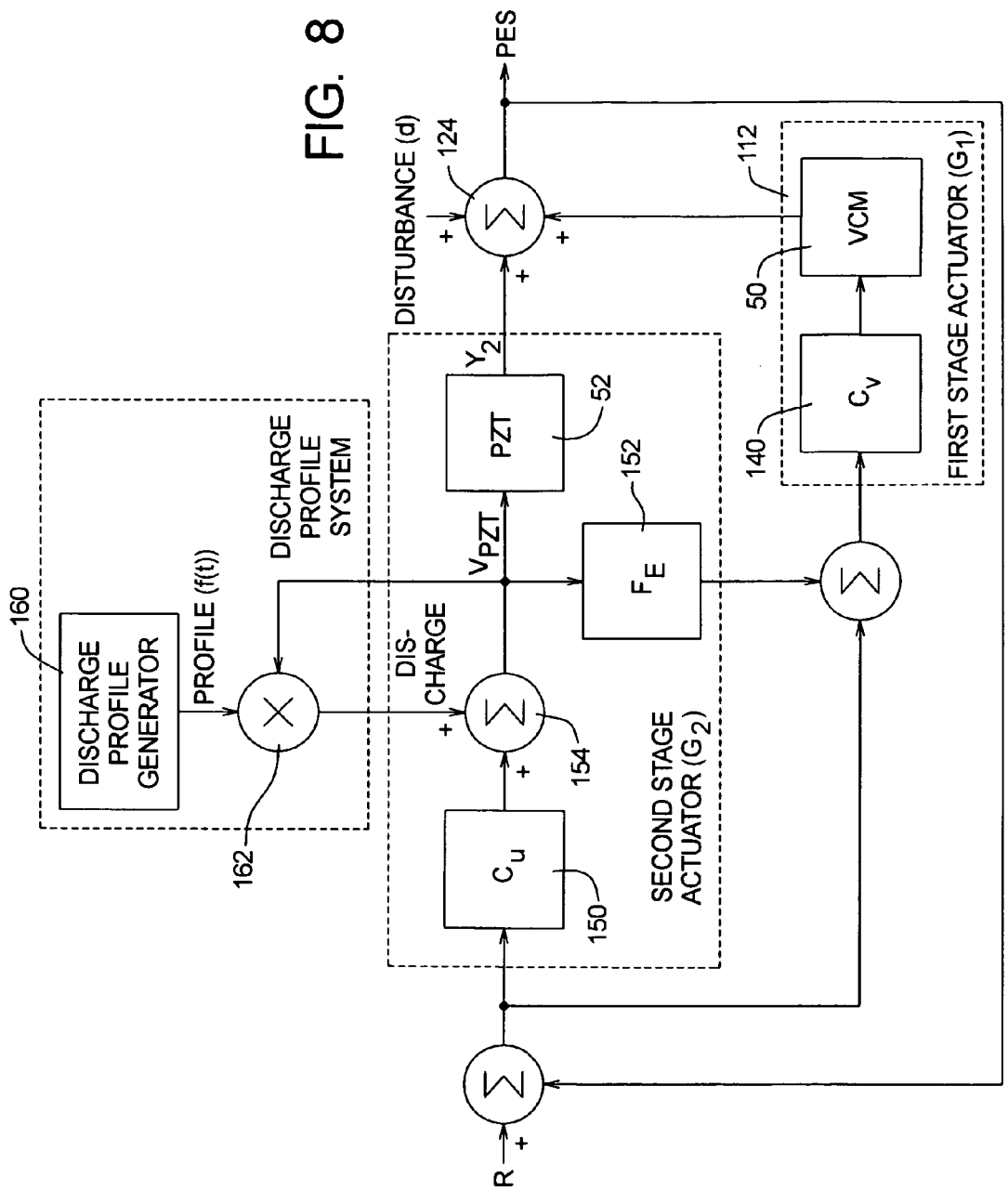
FIG. 8 is a more detailed block diagram of the control system portion depicted in FIG. 7.

The operation of the control system 110 will now be described in further detail with reference to FIGS. 8 and 10. FIG. 8 represents the details of one example of the control system 110. FIG. 8 shows that the first stage 112 comprises a first control circuit ($C_V$) 140 and the primary actuator or VCM 50. The second stage 114 comprises a second control circuit ($C_U$) 150, an estimator circuit ($F_E$) 152, a fourth summer circuit 154, and the secondary actuator or PZT 52. The reset system 116 comprises a profile generator 160 and a multiplier circuit 162.

The profile generator 160 stores a profile function f(t). The profile function f(t) is typically a normalized function that starts out at an initial value of one and decreases to zero along a predetermined linear or non-linear curve and over a predetermined time interval. The predetermined time interval generally defines the duration of the seek/settle process (i.e., the second time period $T_2$).

The multiplier circuit 162 multiplies the profile function f(t) by the PZT voltage to obtain a reset signal. During on-track mode, the profile function f(t) is zero, resulting in the reset signal being zero. The reset system 116 thus has no effect on the control system 110 during on-track mode.

When the disk drive 10 enters seek mode, the profile generator 160 is reset such that profile function f(t) is generated starting from the initial value thereof. The multiplier circuit 162 multiplies the value of PZT voltage when the disk drive 10 enters seek mode, which represents the initial displacement offset, by the profile function f(t) to obtain the reset signal. The reset signal thus starts at the level of the PZT voltage upon entering seek mode and decays to zero at the end of seek mode. The initial displacement offset value may be either positive or negative; in either case, the normalized function determining the profile function f(t) will cause the reset signal to decrease or increase as necessary to reach zero.

The shape, composition, and duration of the profile function f(t) may be determined as necessary for a given implementation of the control system 110. The general considerations for developing the profile function f(t) are to eliminate any displacement offset that may exist at the beginning of the seek/settle process as quickly as possible while reducing or eliminating disturbances introduced into the control system 110. These considerations are somewhat contradictory because, as described above, immediate elimination of the offset value (resetting $V_{PZT}$ to zero) introduces disturbances into the control system 110.

Figure 10:
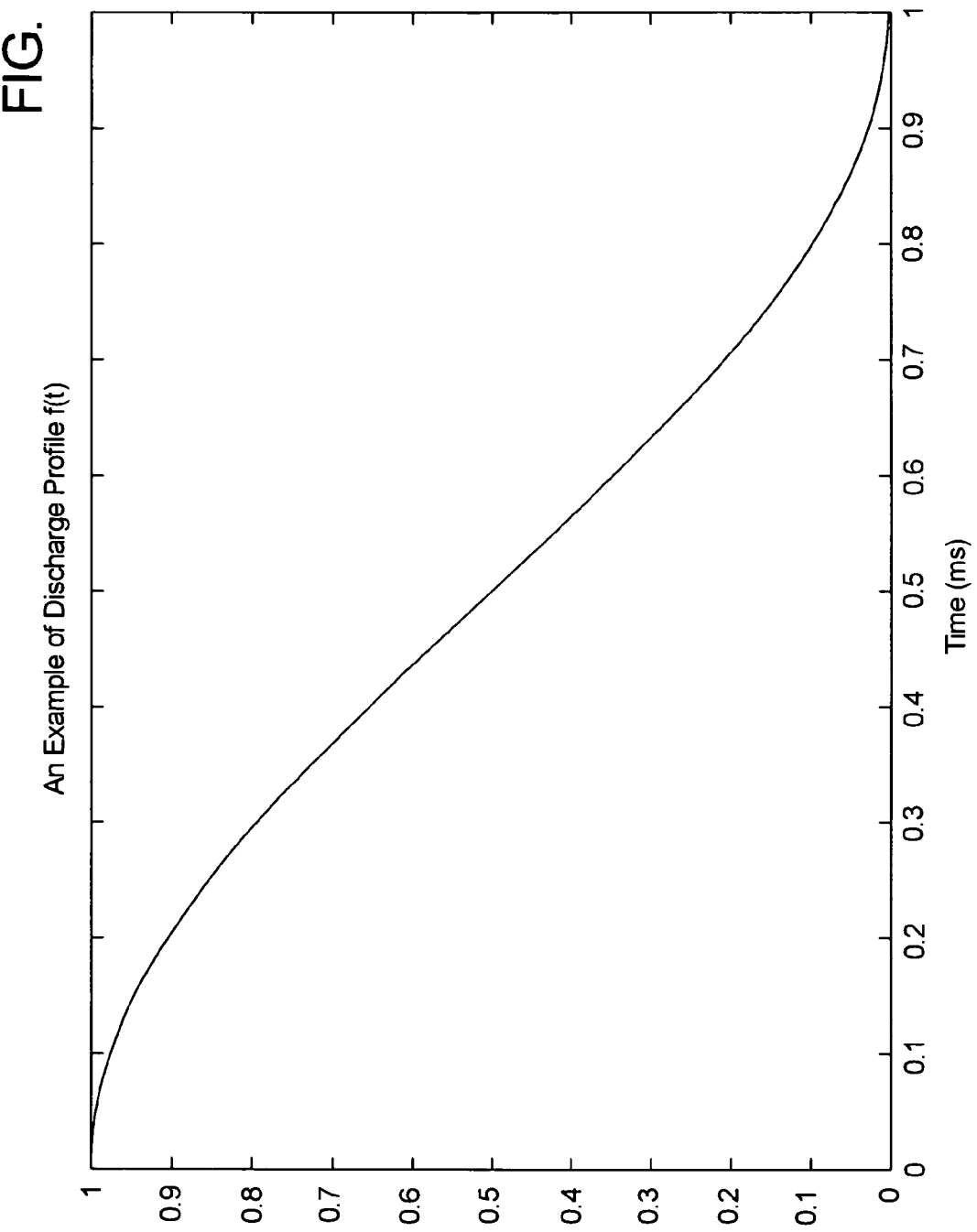
FIG. 10 is a graph illustrating an example of a profile function that may be used by the control system depicted in FIG. 7.

Depicted in FIG. 10 is an example of a profile function f(t) similar to that used by the control system 110 to obtain the exemplary discharge profile 130 depicted in FIG. 9. The exemplary profile function f(t) is an S-curve defined by a half-sine wave. In particular, the profile function f(t) is the portion of a sine wave between $\pi/2$ and $3\pi/2$. The frequency of the sine wave is $1/(2T_2)$. In the example of FIG. 9, the duration $T_2$ of the seek/settle process is approximately 3 milliseconds, but the duration $T_2$ may be longer or shorter depending on the characteristics of a particular disk drive.

A closer examination of FIG. 9 illustrates that, during the single-loop portion 132 of the seek/settle cycle, the control system 110 is in single-loop mode with the second stage 114 is disabled. The PZT voltage is thus generated solely by the profile generator 160 during the time period $T_4$ and decays from approximately 2 volts to approximately 0.9 volts.

During the dual-loop portion of the seek/settle process (time period $T_5$), the control system 110 is in dual-loop mode with the second stage 114 enabled. The PZT voltage is equal to the sum of the output of the second stage control circuit 150 and the output of the profile generator 160. The PZT voltage may thus be represented by a relatively high frequency portion contributed by the control circuit 150 superimposed on a decaying bias portion (the reset signal) contributed by the profile generator 162. Throughout the dual-mode portion of the seek/settle process, the average value of the PZT voltage decreases from approximately 2 volts to approximately zero volts as the reset signal reaches zero volts.

The use of a profile function f(t) defined by an S-curve provides a good balance between aggressive discharge when the control system 110 is in single-loop mode and less aggressive discharge when the control system 110 is in dual-loop mode. However, other shapes, compositions, and durations of the profile function f(t) are possible within the scope of the present invention.

As one example, the profile function f(t) may comprises two separate functions $f_1(t)$ and $f_2(t)$. The first function $f_1(t)$ may be used during the single-mode portion of the dual-mode process, and the second function $f_2(t)$ may be used during the settle portion of the seek/settle process. As another example, the profile function f(t) may be a non-linear shape specifically designed for a particular control system 110.

If the profile function f(t) is linear, the reset signal may be calculated in real time. In any case, the profile function f(t) may be stored in a look-up table. If the profile function f(t) is stored in a look-up table, the values in the look-up table, when read out in a predetermined sequence, define the magnitude of the profile function f(t) at any point in time.

In addition, different profile functions f(t) may be provided depending upon such factors as the characteristics of a particular hard disk 10 and/or the magnitude of the initial displacement offset value of the PZT voltage at the time the seek/settle process is initiated. Each profile function f(t) may define a different profile or shape. The profile function f(t) may also be associated with different durations of the seek/settle process. For example, a longer seek/settle process may be used when the initial displacement offset value is relatively larger.

One of ordinary skill in the art will recognize that the control system 110 of the present invention may be implemented as an analog circuit or in software. Preferably, the control system 110 is implemented as a software program running on a specialized processor forming a part of the control electronics 18.

Figure 11:
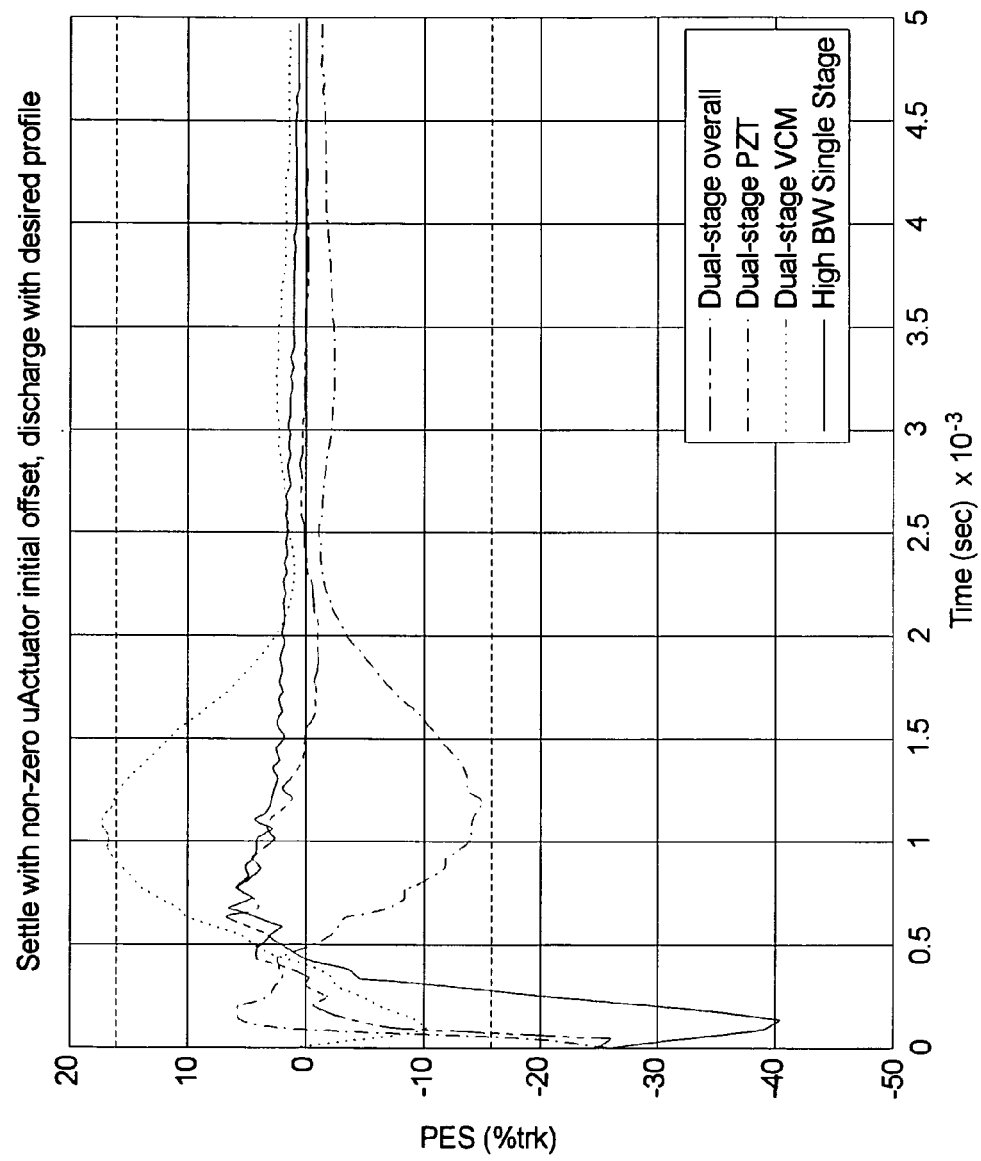

Some of the benefits obtained by the control system 110 will now be described with reference to FIGS. 11–13. Referring initially to FIG. 11, depicted therein are the settle characteristics of a dual-stage system with a non-zero initial displacement value and a 2 millisecond half-sine wave profile. FIG. 11 illustrates a significant improvement in settle time as compared to the reference high-bandwidth single stage actuator system.

Figure 12:
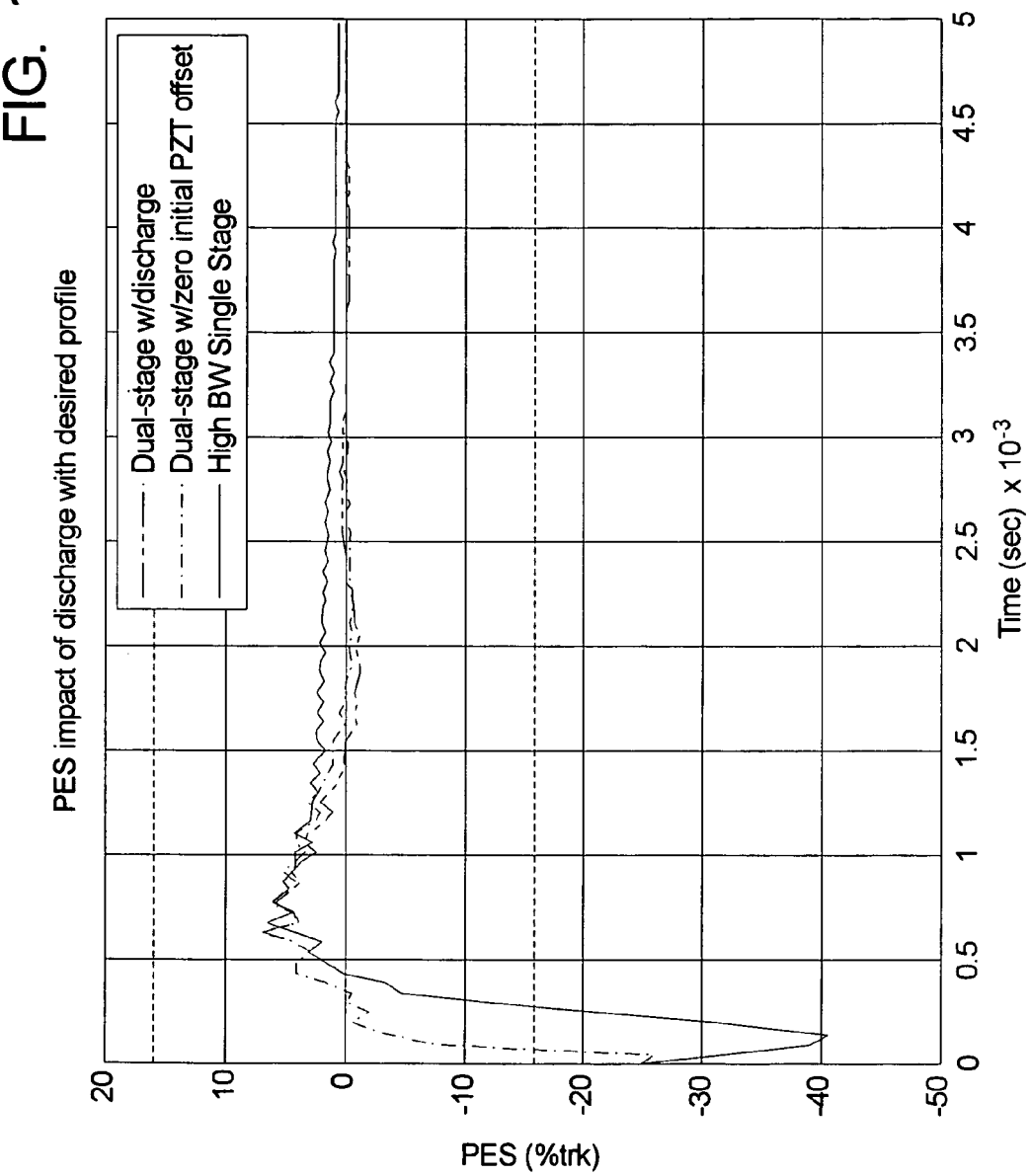

FIGS. 12 and 13 illustrate the effect of the control system 110 of the present invention in the ideal case of zero initial displacement offset. FIG. 12 illustrates no degradation in settle time as compared to the reference high-bandwidth single stage actuator system. FIG. 13 illustrates no degradation in settle time as compared to the reference high-bandwidth single stage actuator system and to a dual-stage system using the control system 60 described above.

It will be understood that the invention may be embodied in other specific forms without departing from the spirit or central characteristics thereof. The numerical values recited herein are for illustrative purposes only, and the present invention may be embodied in other forms utilizing different numerical parameters. The present examples and embodiments, therefore, are to be considered in all respects as illustrative and not restrictive, and the invention is not intended to be limited to the details given herein.

The invention claimed is:

1. A control system for a disk drive including first and second actuator arms, comprising:
   a first stage for displacing the first arm;
   a second stage for displacing the second arm relative to the first arm, wherein the second stage defines a displacement offset when the disk drive begins a seek operation; and
   a reset system for discharging at least a portion of the displacement offset during the seek operation, said reset system including a profile function defining the discharge of the displacement offset during the seek operation.

2. A control system as recited in claim 1, wherein the reset system comprises a profile generator for generating the profile function defining the discharge of the displacement offset.

3. A control system as recited in claim 2, wherein the reset system further generates a reset signal based on the profile function and the displacement offset at the time the disk drive ends a track following operation and begins the seek operation.

4. A control system as recited in claim 3, wherein the second stage comprises:
   a second stage control circuit; and
   a summer circuit for summing the output of the second stage control circuit and the reset signal.

5. A control system as recited in claim 1, wherein the reset system generates a reset signal based on the displacement offset at the time the disk drive ends a track following operation and begins the seek operation.

6. A control system as recited in claim 1, wherein the reset system discharges the displacement offset based on the profile function.

7. A control system as recited in claim 6, wherein the profile function causes the displacement offset to be reset to zero.

8. A control system as recited in claim 7, wherein the profile function causes the displacement offset to be reset to zero during the seek operation.

9. A control system as recited in claim 7, wherein the profile function causes the displacement offset to be reset to zero based on a predetermined profile.

10. A control system as recited in claim 9, wherein the profile function causes the displacement offset to be reset to zero over a predetermined time period, wherein the predetermined time period and the predetermined profile are selected at least in part to reduce saturation of and disturbances introduced into the control system.

11. A hard drive system, comprising:
   a recording disk for storing information;
   a head for reading information from and writing information to the disk;
   an actuator arm assembly including:
      a first arm defining a first proximal end and a first distal end, wherein the first proximal end is rotatably supported relative to the disk,
      a second arm defining a second proximal end and a second distal end, wherein the first distal end rotatably supports the second proximal end and the second distal end supports the head adjacent to the recording disk;
   a first stage for displacing the first arm relative to the disk;
   a second stage for displacing the second arm relative to the first arm, wherein the second stage defines a displacement offset when the disk drive begins a seek operation; and
   a reset system for discharging at least a portion of the displacement offset during the seek operation, said reset system including a profile function defining the discharge of the displacement offset during the seek operation.

12. A hard drive system as recited in claim 11, wherein the reset system comprises a profile generator for generating the profile function defining the discharge of the displacement offset.

13. A hard drive system as recited in claim 12, wherein the reset system further generates a reset signal based on the profile function and the displacement offset at the time the disk drive ends a track following operation and begins the seek operation.

14. A control system as recited in claim 13, wherein the second stage comprises:
a second stage control circuit; and
a summer circuit for summing the output of the second stage control circuit and the reset signal.

15. A hard drive system as recited in claim 11, wherein the reset system generates a reset signal based on the displacement offset at the time the disk drive ends a track following operation and begins the seek operation.

16. A control system as recited in claim 11, wherein the reset system discharges the displacement offset based on the profile function.

17. A control system as recited in claim 16, wherein the profile function causes the displacement offset to be reset to zero.

18. A control system as recited in claim 17, wherein the profile function causes the displacement offset to be reset to zero during the seek operation.

19. A control system as recited in claim 17, wherein the profile function causes the displacement offset to be reset to zero based on a predetermined profile.

20. A control system as recited in claim 19, wherein the profile function causes the displacement offset to be reset to zero over a predetermined time period, wherein the predetermined time period and the predetermined profile are selected at least in part to reduce saturation of and disturbances introduced into the control system.

21. A method of displacing first and second actuator arms of a disk drive, comprising:
providing a first stage for displacing the first arm;
providing a second stage for displacing the second arm relative to the first arm;
determining a displacement offset of the first arm relative to the second arm when the disk drive begins a seek operation; and
discharging at least a portion of the displacement offset during the seek operation, wherein a profile function defines the discharge of the displacement offset during the seek operation.

22. A method as recited in claim 21, wherein the step of discharging at least a portion of the displacement offset includes the step of generating the profile function defining the discharge of the displacement offset.

23. A method as recited in claim 22, wherein the step of discharging at least a portion of the displacement offset includes the step of generating a reset signal based on the profile function and the displacement offset at the time the disk drive ends a track following operation and begins the seek operation.

24. A method as recited in claim 23, wherein the step of providing the second stage includes the steps of providing a second stage control circuit, the method further including the step of summing the output of the second stage control circuit and the reset signal.

25. A method as recited in claim 21, wherein the step of discharging at least a portion of the displacement offset includes the step of generating a reset signal based on the displacement offset at the time the disk drive ends a track following operation and begins the seek operation.

26. A method as recited in claim 21, wherein the step of providing the second stage includes the step of discharging the displacement offset based on the profile function.

27. A method as recited in claim 26, wherein the step of discharging the displacement offset includes the step of resetting the displacement offset to zero.

28. A method as recited in claim 27, wherein the step of discharging the displacement offset includes the step of resetting the displacement offset to zero during the seek operation.

29. A method as recited in claim 27, wherein the step of discharging the displacement offset includes the step of resetting the displacement offset to zero based on a predetermined profile.

30. A method as recited in claim 29, wherein the step of discharging the displacement offset includes the steps of:
resetting the displacement offset to zero over a predetermined time period; and
selecting the predetermined time period and the predetermined profile at least in part to reduce saturation of and disturbances introduced into the control system.

31. A hard drive system for performing track following operations and seek operations, comprising:
a recording disk for storing information on a plurality of tracks;
a head for reading information from and writing information to the disk when the hard drive system is performing a track following operation;
an actuator arm assembly including:
a first arm defining a first proximal end, a first distal end, and a first arm axis, wherein the first proximal end is rotatably supported relative to the disk,
a second arm defining a second proximal end, a second distal end, and a second arm axis, wherein the first distal end rotatably supports the second proximal end and the second distal end supports the head adjacent to the recording disk;
a dual-stage control system including:
a first stage including a voice coil motor for displacing the first arm relative to the disk to position the head adjacent to an initial track, and
a second stage including a piezo-electric transducer for displacing the second arm relative to the first arm to cause the head to follow the initial track, wherein the second stage defines a displacement offset corresponding to an angular difference between the first arm axis and the second arm axis when the disk drive enters a seek operation; and
a reset system for discharging at least a portion of the displacement during the seek operation, said reset system including a profile function defining the discharge of the displacement offset during the seek operation.

32. A hard drive system as recited in claim 31, wherein the reset system comprises a profile generator for generating the profile function defining the discharge of the displacement offset.

33. A hard drive system as recited in claim 32, wherein the reset system generates a reset signal based on the profile function and the displacement offset at the time the disk drive ends a track following operation and begins the seek operation.

34. A hard drive system as recited in claim 33, wherein the second stage comprises:
a second stage control circuit; and
a summer circuit for summing the output of the second stage control circuit and the reset signal.

35. A hard drive system as recited in claim 31, wherein the reset system generates a reset signal based on the displacement offset at the time the disk drive ends a track following operation and begins the seek operation.

36. A hard drive system as recited in claim 31, wherein the reset system discharges the displacement offset based on the profile function.

37. A hard drive system as recited in claim 36, wherein the profile function causes the displacement offset to be reset to zero.

38. A hard drive system as recited in claim 37, wherein the profile function causes the displacement offset to be reset to zero during the seek operation.

39. A hard drive system as recited in claim 37, wherein the profile function causes the displacement offset to be reset to zero based on a predetermined profile.

40. A hard drive system as recited in claim 39, wherein the profile function causes the displacement offset to be reset to zero over a predetermined time period, wherein the predetermined time period and the predetermined profile are selected at least in part to reduce saturation of and disturbances introduced into the dual-stage control system.

41. A hard drive system as recited in claim 31, wherein the first stage comprises a control circuit for controlling the piezo-electric transducer, wherein the reset system discharges the displacement offset by altering an output of the control circuit for at least a portion of the time the hard drive system is performing the seek operation.

42. A hard drive system as recited in claim 41, wherein:

the reset system generates a discharge signal; and the first stage combines the discharge signal with the output of control circuit to obtain a PZT voltage for controlling the piezo-electric transducer.

* * * * *